United States Patent
McCullough

[15] 3,655,148
[45] Apr. 11, 1972

[54] CONTROL MECHANISM
[72] Inventor: Edward E. McCullough, Brigham City, Utah
[73] Assignee: Thiokol Chemical Corporation, Bristol, Pa.
[22] Filed: June 20, 1969
[21] Appl. No.: 839,780

[52] U.S. Cl. .................................. 244/3.22, 137/636.1
[51] Int. Cl. ............................................ F41g 7/00
[58] Field of Search ........... 74/110; 137/82, 83; 244/1 SA, 244/3.22; 137/636.1, 625.5

[56] References Cited
UNITED STATES PATENTS

| | | | |
|---|---|---|---|
| 2,402,027 | 6/1946 | Crowther | 74/110 |
| 2,923,315 | 2/1960 | Bletcher et al. | 137/636.1 |
| 3,221,760 | 12/1965 | Buchanan | 137/82 |
| 3,511,103 | 5/1970 | Cox, Jr. | 74/110 |
| 3,515,170 | 6/1970 | Mullaly | 137/636.1 |

*Primary Examiner*—Verlin R. Pendegrass
*Attorney*—Edward E. McCullough

[57] ABSTRACT

A cam body, movable both axially and laterally, is so shaped and positioned relative to cam followers that the total possible response thereof to movements of the cam body may be at any instant, (1) regulated from a maximum to zero, (2) proportioned as desired to secondary devices operated by the followers, and (3) subdivided into constant-proportion components of response metered to each of such devices.

7 Claims, 7 Drawing Figures

Patented April 11, 1972

INVENTOR.
EDWARD E. McCULLOUGH

BY

Edward E. McCullough
AGENT

Patented April 11, 1972
3,655,148
2 Sheets-Sheet 2
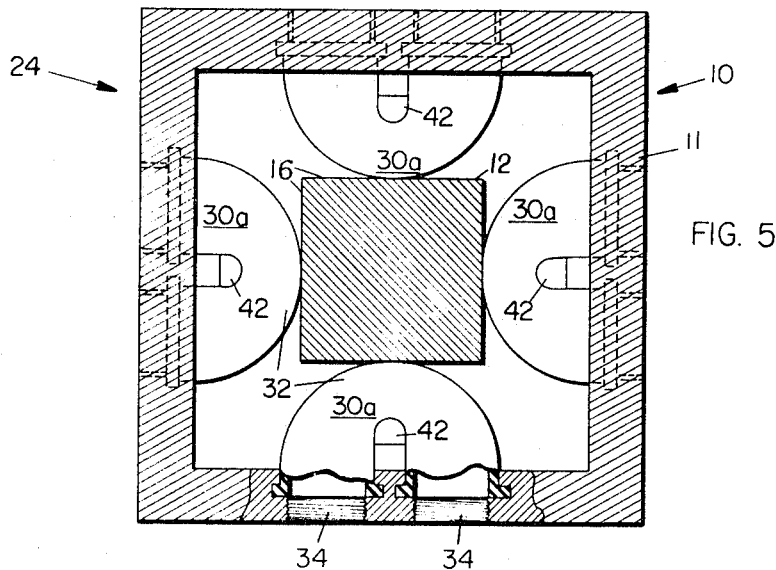
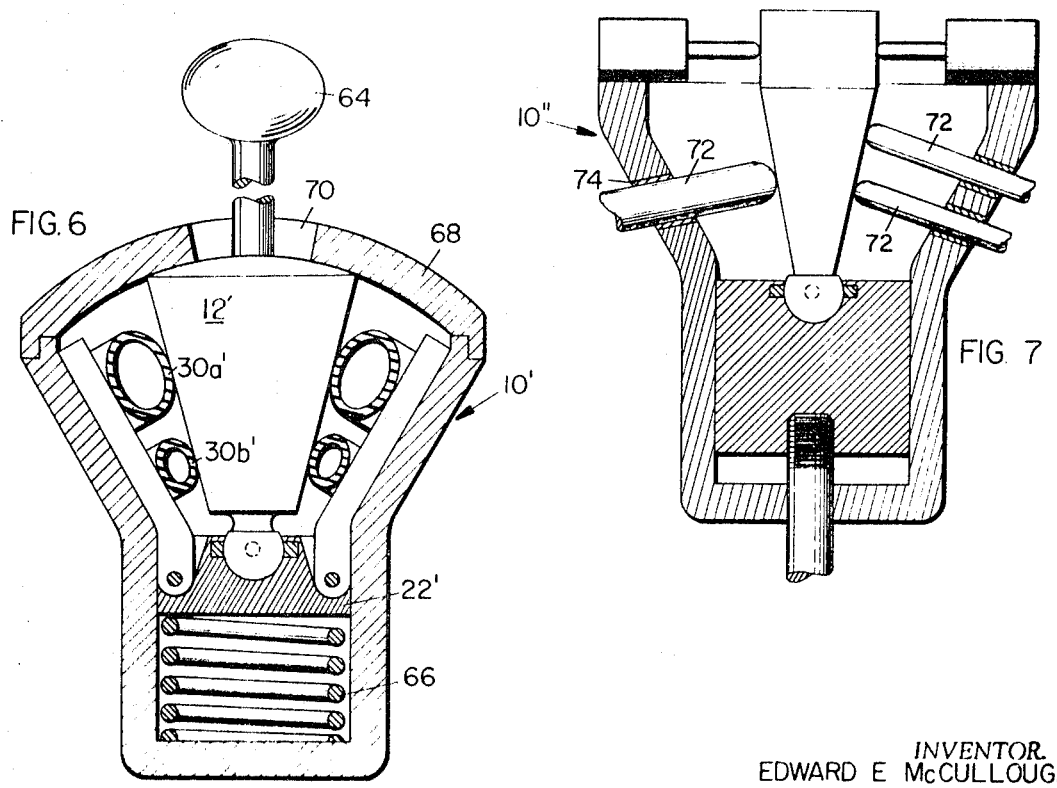
INVENTOR.
EDWARD E. McCULLOUGH
BY
Edward E. McCullough
AGENT

CONTROL MECHANISM

BACKGROUND OF THE INVENTION

This invention relates to controls; and, more particularly, it relates to controls capable of automatically proportioning components of some quantity (as of fluid or electric current) for proportionate operation of secondary devices. The invention herein described was made in the course of or under a contract with the U.S. Air Force.

There are a number of applications wherein a total of some quantity of fluid, etc., at any given instant must be metered proportionately to two or more secondary devices. Examples of this requirement are found in systems for steering rockets wherein a quantity of fluid is distributed to two or more ports through which it may be injected into the rocket nozzle or into small secondary motors to provide side forces on the rocket. This is ordinarily accomplished by individual valves operated remotely, resulting in a very complex system tending toward inefficiency.

SUMMARY OF THE INVENTION

The present invention is a compact, unified control wherein cam followers capable of operating such secondary devices are arranged in contact with surfaces of a cam body such that movement thereof automatically imparts to each cam follower the appropriate amount of motion to produce the required effect in a secondary device operated thereby.

An object of the invention is to provide a light-weight, compact, unified control for proportioning components of some quantity to secondary devices.

Another object of the invention is to provide such a control wherein the total possible response to be proportioned to secondary devices may be any quantity thereof from a maximum to zero.

Another object of the invention is to meter components of some quantity in constant proportions to each secondary device.

Another object of the invention is to meter fluids, etc., to secondary devices with a greater degree of precision than has heretofore been possible.

Other objects and advantages of the invention will become apparent as it is disclosed in the following detailed description and accompanying drawings, wherein identical characters designate the same parts throughout the disclosure.

BRIEF DESCRIPTION OF THE DRAWINGS

In the drawings:

FIG. 5 is a transverse section taken on line 5—5 of FIG. 1;

FIG. 6 is a longitudinal section of a second embodiment of the invention; and

FIG. 7 is a longitudinal section of a third embodiment of the invention.

DESCRIPTION OF THE PREFERRED EMBODIMENTS

Figure 1:
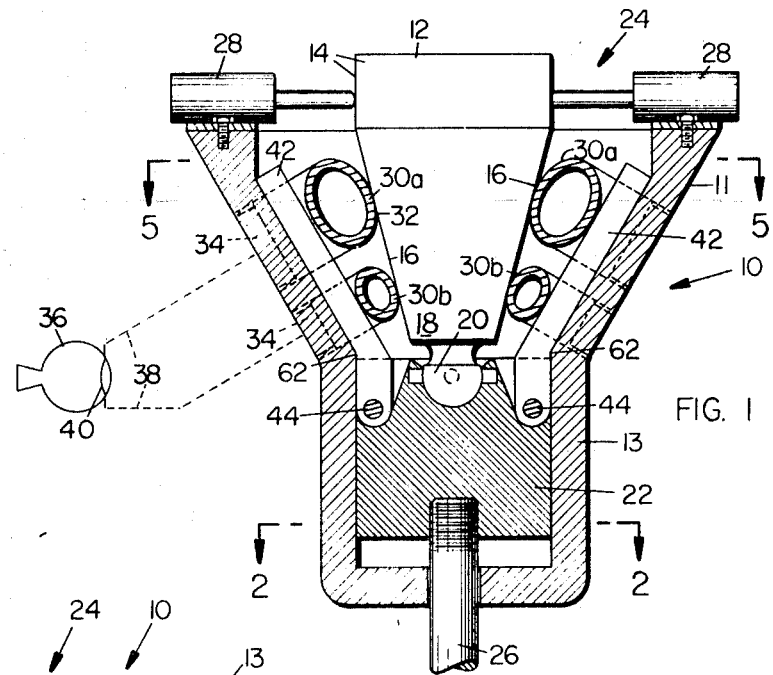
FIG. 1 is a central, longitudinal section of a preferred embodiment of the invention.
Figure 2:
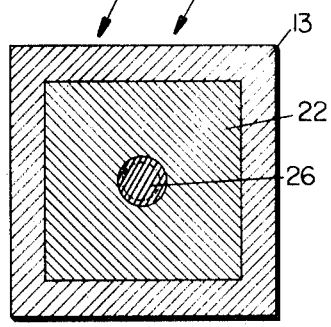
FIG. 2 is a transverse section taken on line 2—2 of FIG. 1.
Figure 3:
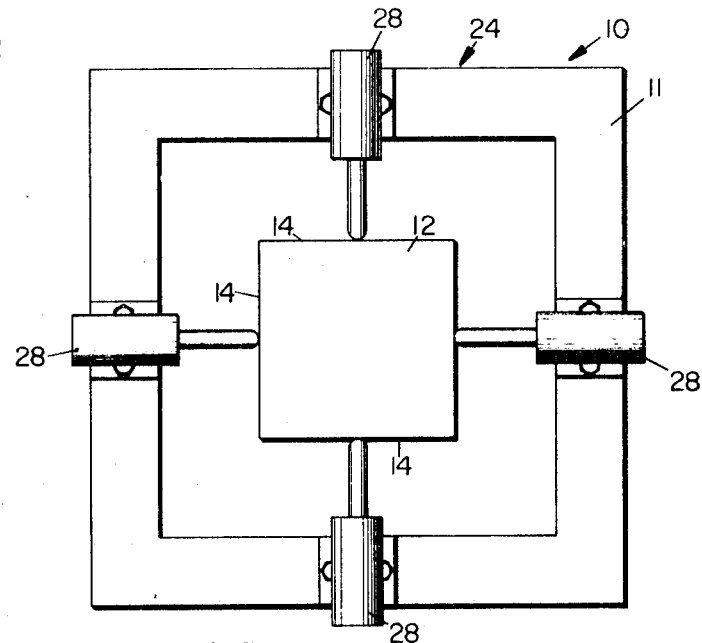
FIG. 3 is a top view of the invention.
Figure 4:
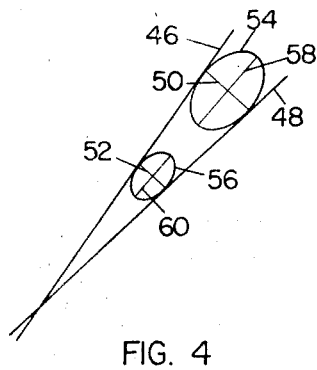
FIG. 4 is a line diagram showing how the cam followers of FIG. 1 meter components of an effect in constant proportions.

A preferred embodiment of the invention, shown in FIGS. 1 through 5, has a housing 10 having the shape of a hollow, truncated pyramid 11 intersecting a hollow cuboid form 13. A cam body 12 positioned within the housing 10 has bearing surfaces 14 and convergent cam surfaces 16. The small end 18 of the cam body 12 is gimbaled at 20 to a guide block 22, so that it cannot rotate about the longitudinal axis of the control 24 relative to the guide block 22. The guide block 22 fits into the cuboid portion 13 of the housing 10 for axial sliding movement therein so that the guide block 22 cannot rotate relative to the housing 10. Although the guide block 22 and the interior of the portion of housing 10 into which it fits are both of rectangular cross section, it is obvious that they would function equally well if of any noncircular cross section. The guide block 22 may be moved in axial directions by some actuation means, here represented by an actuation arm 26 threadedly engaged to the guide block 22 and attached to the piston of a fluid-operated cylinder not shown. The cam body 12 may be moved in lateral directions by opposing, fluid-operated actuators 28 mounted on the base of the pyramidal portion 11 of the housing 10. A plurality of U-shaped, resilient tubes 30a and 30b are mounted in the housing 10 so that the bend portions 32 thereof are in contact with the cam surfaces 16 of the cam body 12 and the open-end portions 34 penetrate the walls of the housing 10 for communication with some secondary devices. Hence the sides of the tubes 30a and 30b that are in contact with the cam surfaces 16 respond to movements of the cam body 12 in the manner of cam followers to change the cross-sectional forms of the tubes at their bend portions 32. In the application shown, the secondary devices are small, liquid-fuel, vernier reaction motors 36, used for steering a rocket not shown. In practice, they would be arranged circumferentially about the base of the rocket and outwardly directed. One of these motors 36 is shown schematically in FIG. 1. Fuel and oxidizer lines, represented by broken lines 38, connect a conventional fuel injector 40 of the motor 36 with the tubes 30a and 30b. Levers 42, pivoted at 44 to the guide block 22, normally rest on the walls of the pyramidal portion 11 of the housing 10, with the bend portions 32 of the tubes 30a and 30b being confined between the levers 42 and the cam surfaces 16 of the cam body 12.

In the embodiment shown, the relative sizes of the tubes 30a and 30b are selected to admit passage therethrough of the desired proportions of fuel and oxidizer. If, for example, these sizes are selected so that the quantity of oxidizer flowing through tubes 30a should be four times as great as the quantity of fuel flowing through tubes 30b, it can be seen that this proportion will remain substantially constant regardless of lateral or axial movements of the cam body 12. This results from the fact that cross-sectional areas of the tubes 30a and 30b are always approximately similar figures, from a geometrical point of view (see FIG. 4). If lines 46 and 48 in the plane of the cam surface 16 and the surface of the lever 42, respectively, between which a given set of tubes 30a and 30b are confined, are extended to intersection as shown (the point of intersection being the center of rotation for the cam-surface line 46), then the minor axes 50 and 52 of the ellipses 54 and 56 representing the cross-sectional areas of the tubes become sides of similar triangles, and, hence, are always proportional. Also, since small, proportional adjustments are also made in the lengths of the major axes 58 and 60 because of constant circumferences of the ellipses 54 and 56, it can be said that the cross sectional areas of the tubes 30a and 30b are always proportional at the bend portions 32, admitting fuel and oxidizer therethrough in constant proportions.

In the extreme open and laterally neutral position of the cam body 12, as shown in FIG. 1, the tubes 30a and 30b are all half closed so that, when the cam body 12 is moved into an extreme lateral position, the tubes 30a and 30b on one side thereof will be completely closed while those on the opposite side will be completely open. The cam body 12 never loses actual contact with any of the tubes 30a and 30b. If such loss of contact were permitted, the total quantity of propellant being delivered to the complete set of motors 36 would be changed without effecting the desired proportional thrust of one motor 36 relative to its diametrically, opposite counterpart. When the guide block 22 is moved away from the cam followers (tubes 30a and 30b), the levers 42 are forced away from the walls of the housing 10 by the shoulders 62 at the intersection of the pyramidal and cuboid portions of the housing 10 so that they close all tubes 30a and 30b to the extent that the guide block 22 is moved. In this way the total amount of fuel delivered to the complete set of motors 36 may be varied from a maximum to zero, while permitting the instantaneous total to be metered proportionally to the individual motors 36. At the same time, the constant proportion of fuel to oxidizer metered to any given motor 36 is never altered.

FIG. 6 shows a manually-operable version of the invention, which may be used in a manner identical to that of FIG. 1, and for the same purposes, except that the actuators 28 and the axial actuation arm 26 are replaced by a handle 64 attached to one end of the cam body. To provide greater ease of control, a compression spring 66 is confined between the guide block 22' and the small, closed end of the housing 10'. The spring 66 maintains the tubes 30a' and 30b' in a normally open position until opposing force is exerted by an operator on the handle 64. An end closure 68, having an aperture 70 through which the handle 64 projects, is press fitted to the housing 10'. The aperture 70 is large enough to allow the cam body 12' to close any set of tubes 30a' and 30b' when lateral pressure is exerted by an operator on the handle 64. This embodiment of the invention is particularly well adapted for use as a control in a manned space capsule or other jet-propelled vehicle.

A third embodiment of the invention is shown in FIG. 7. This embodiment operates in a manner similar to that of FIG. 1, and is similarly constructed, except that the cam followers are not pinch valves. The tubes 30a and 30b and the levers 42 of FIG. 1 are here replaced by rods 72, slidably mounted at 74 in the sides of the housing 10''. All other parts are identical to those of the embodiment shown in FIG. 1. This is a particularly versatile form of the invention, since the rods 72 can be used to operate any of a variety of secondary devices, such as potentiometers, valves, fluid actuators, etc. The primary objective, however, is the same as that for the other two embodiments of the invention, i.e., that the totality of a given quantity (of fluid, electric current, etc) may be selectively proportioned among individual ones of a plurality of secondary devices, that this totality may be varied from a maximum to zero, and that separate components of that quantity may be metered to each of the secondary devices in constant proportions regardless of how the total is distributed. This last property may be derived if the rods 72 are used in pairs as are the tubes 30a and 30b in FIG. 1. It is obvious that both tubes and rods may be pluralized beyond sets of two, if there are more than two components of the total effect to be metered out in constant proportions to each secondary device. The relative response of each rod 72 of a set is determined by its position with respect to the center of rotation of the cam body 12.

An invention has been described herein which provides a compact and versatile control for a number of useful applications. Although it has been set forth with considerable specificity regarding detail, it is noted that such details may be altered without departing from the scope of the invention. For example, the guide means for the cam body 12, shown in FIG. 1 as comprising the noncircular guide block 22 attached by gimbal to the cam body 12 and slidably fitted into a noncircular portion of the housing 10, could be replaced by equivalent mechanisms, such as (1) keying the actuation arm 26 to the fluid actuator to which it is connected, to prevent rotation thereof (in which case the only function of the guide block 22 would be for mounting the levers 42), and (2) fitting crossbars to the ends of the arms of actuators 28 so that the crossbars bear against the bearing surfaces 14 and extend laterally, whereby rotation of the cam body 12 about the axis of motion of guide block 22 would be prevented.

The invention claimed is:

1. A control mechanism comprising:
   a housing;
   a cam body having convergent cam surfaces and positioned within the housing for both lateral and axial movement therein;
   a noncircular guide block that fits into a portion of the housing for axial sliding movement therein, that portion of the housing being appropriately shaped to fit the guide block;
   a gimbal connecting the guide block to the cam body to prevent rotation thereof about the axis of the housing;
   cam followers mounted in the housing, and in contact with the convergent cam surfaces of the cam body for response to movements thereof, the cam followers being in sets of at least two for each cam surface and the cam followers of each set being arranged in tandem from the gimbal, whereby they may represent constant-proportion components of each output; and
   actuation means mounted on the housing and operatively in contact with the cam body for moving it axially and laterally relative to the housing.

2. The control mechanism of claim 1 wherein the cam followers are sides of resilient tubes, so that, responsive to movement of the cam body, the cross-sectional area of at least a portion of each tube will be changed in size, thereby altering the quantities of any fluid passing through the tubes.

3. The control mechanism of claim 2 wherein a set of more than one of said tubes having selected diameters is responsive to the same cam surface; and further including a lever hinged to the cam body so that the tubes are confined between the lever and the cam surface; and a shoulder fixed into the housing in contact with the lever, so that axial motion of said cam body may cause the shoulder to act as a fulcrum to move the lever relative to the cam body and thereby vary the openness of the tubes to a degree corresponding to the extent that the cam body is moved, whereby the cross-sectional area of each tube of the set is maintained in constant proportion to those of the other tubes responsive to the same cam surface.

4. The control mechanism of claim 1 wherein the cam followers are rods slidably mounted in the housing for operating secondary devices.

5. The control mechanism of claim 1 wherein a set of cam followers are rods responsive to the same cam surface, relative response of each rod of the set to movements of the cam body being determined by its position with respect to the center of rotation for the cam body.

6. The control mechanism of claim 1 wherein the actuation means comprises a double-acting, fluid-operated actuator fixed to the housing and attached to the cam body for axial movement thereof, and a plurality of fluid-operated actuators mounted on the housing circumferentially about said cam body and in contact therewith for lateral movement thereof.

7. The control mechanism of claim 1 wherein the actuation means comprises a handle fixed to the cam body, and spring means bearing against the cam body and the housing, biasing the cam body away from one end thereof so that force exerted on the handle is opposed by the spring means, and the housing has an aperture, through which the handle may extend, large enough to permit lateral movement of the handle but not large enough to permit passage of the cam body therethrough.

* * * * *